United States Patent
Peng et al.

(10) Patent No.: US 12,355,780 B2
(45) Date of Patent: Jul. 8, 2025

(54) CONTROL PLANE BASED SECURITY PROVISIONING IN A NON-PUBLIC NETWORK

(71) Applicant: ZTE Corporation, Guangdong (CN)

(72) Inventors: Jin Peng, Guangdong (CN); Shilin You, Guangdong (CN); Yuze Liu, Guangdong (CN); Zhen Xing, Guangdong (CN); Zhaoji Lin, Guangdong (CN)

(73) Assignee: ZTE Corporation, Shenzhen (CN)

( * ) Notice: Subject to any disclaimer, the term of this patent is extended or adjusted under 35 U.S.C. 154(b) by 243 days.

(21) Appl. No.: 18/139,906

(22) Filed: Apr. 26, 2023

(65) Prior Publication Data

US 2024/0080321 A1    Mar. 7, 2024

Related U.S. Application Data

(63) Continuation of application No. PCT/CN2021/076676, filed on Feb. 18, 2021.

(51) Int. Cl.
*H04L 9/40* (2022.01)
*H04W 8/20* (2009.01)
*H04W 12/06* (2021.01)

(52) U.S. Cl.
CPC .......... *H04L 63/123* (2013.01); *H04W 8/205* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2019/0223063 A1* | 7/2019 | Palanigounder | H04W 60/005 |
| 2022/0150684 A1* | 5/2022 | Palanigounder | H04W 12/0431 |
| 2023/0262457 A1* | 8/2023 | Baskaran | H04W 8/22 455/410 |
| 2023/0388797 A1* | 11/2023 | Tiwari | H04W 36/142 |
| 2024/0259797 A1* | 8/2024 | Fu | H04W 12/08 |

FOREIGN PATENT DOCUMENTS

WO    2020073014 A1    4/2020

OTHER PUBLICATIONS

International Search Report and Written Opinion for International Application No. PCT/CN2021/076676, mailed on Nov. 24, 2021, 7 pages.

(Continued)

*Primary Examiner* — Joseph P Hirl
*Assistant Examiner* — Hassan Saadoun
(74) *Attorney, Agent, or Firm* — Perkins Coie LLP

(57) ABSTRACT

This patent document describes, among other things, techniques, and apparatuses for providing onboarding and provisioning of networks. In one aspect, a method of wireless communication is disclosed. The method includes receiving, by a first network node from a second network node, an authentication notification including an identifier for a third network node where a key is stored. The method further includes transmitting, by a first network node, a wireless device parameter update message to the third network node identified by the identifier.

18 Claims, 11 Drawing Sheets

(56) References Cited

OTHER PUBLICATIONS

Samsung, "KI#4, new Solution: UE onboarding via control plane," 3GPP TSG WG SA2 #139, e-meeting, Elbonia, S2-2003903, Jun. 1-12, 2020, 7 pages.
Huawei et al., "KI#4, Sol#6, update the architecture figure," 3GPP TSG WG SA2 #142E, e-meeting, Elbonia, S2-2008399, Nov. 16-20, 2020, 6 pages.
Huawei et al., "KI#4, Sol#32: Update to clarify and correct the solution 32, " 3GPP TSG WG SA2 #141E, e-meeting, Elbonia, S2-2007850, Oct. 12-23, 2020, 6 pages.
Samsung et al., "Handling of KAUSF upon successful primary authentication," 3GPP TSG SA3 #101-e, e-meeting, S3-203251, Nov. 9-20, 2020, 13 pages.
European Search Report for EP Patent Application No. 21926088.2, dated on Oct. 4, 2023, 9 pages.
3GPP TS 33.501 V16.2.0 (Mar. 2020), Technical Specification, 3rd Generation Partnership Project; Technical Specification Group Services and System Aspects; Security architecture and procedures for 5G system (Release 16), 227 pages.
3GPP TR 23.700-07 V1.2.0 (Nov. 2020), Technical Report, 3rd Generation Partnership Project; Technical Specification Group Services and System Aspects; Study no enhanced support of non-public networks (Release 17), 247 pages.
Ericsson, "Selection of latest KAUSF for SoR/UPU and storage of KAUSF in the UE and AUSF," 3GPP TSG-SA3 Meeting #101-e, S3-203227, e-meeting, Nov. 9-20, 2020, Change Request, 14 pages.

\* cited by examiner

900

Receiving, by a first network node from a second network node, an authentication notification indicating a successful authentication of a wireless device — 910

Transmitting, by the first network node to a third network node a provisioning request message including an identifier of the wireless device and provisioning data — 920

FIG. 9

CONTROL PLANE BASED SECURITY PROVISIONING IN A NON-PUBLIC NETWORK

CROSS-REFERENCE TO RELATED APPLICATIONS

This application is a continuation of International Patent Application No. PCT/CN2021/076676, filed on Feb. 18, 2021, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity using public as well as non-public networks. Other aspects, such as energy consumption, device cost, spectral efficiency, and latency are also important to meeting the needs of various communication scenarios. Various techniques, including new ways to provide higher quality of service, longer battery life, and improved performance in public and non-public networks are being discussed.

SUMMARY

This patent document describes, among other things, techniques, and apparatuses for providing onboarding and provisioning of networks.

In one aspect, a method of wireless communication is disclosed. The method includes receiving, by a first network node from a second network node, an authentication notification including an identifier for a third network node where a key is stored. The method further includes transmitting, by a first network node, a wireless device parameter update message to the third network node identified by the identifier.

In another aspect, another method for wireless communications is disclosed. The method includes receiving, by a first network node from a second network node, an authentication notification indicating a successful authentication of a wireless device. The method further includes transmitting, by the first network node to a third network node a provisioning request message including an identifier of the wireless device and provisioning data.

In another aspect, a wireless communication apparatus comprising a processor configured to implement a method described herein is disclosed.

In another aspect, computer readable medium including executable instructions to implement a method described herein is disclosed.

These, and other, aspects are described in the present document.

BRIEF DESCRIPTION OF DRAWINGS

FIGS. 8-9 shows examples of processes.

DETAILED DESCRIPTION

Certain features are described using the example of Fifth Generation (5G) wireless protocol. However, applicability of the disclosed techniques is not limited to only 5G wireless systems.

Disclosed are techniques, processes, systems, and apparatuses to provide enhanced security to user equipment (UE) parameter update messages (UPU) (which may also be referred to as wireless device parameter update messages) in non-public networks (NPN) as well as other applications. Current technology does not provide for security credentials between the UE (or wireless device) and a provisioning server during an onboarding procedure. As such, current technology fails to provide security protection for UPU messages in NPN networks which the instant disclosed technology solves among other improvements.

As context, the features of NPN and its later version, eNPN, cellular standards specify support for the non-public networks of vertical customers. Non-public networks can be of at least two types: standalone NPN (SNPN) or public network integrated NPN (PNi-NPN). For scalability and flexibility of terminal devices, eNPN includes onboarding and provisioning of NPN UEs/wireless devices.

Example definitions of some relevant terms are listed below:

Default UE credentials: Information that the UE has before the actual onboarding procedure to make it uniquely identifiable and verifiably secure.

Default credential server (DCS): A server that can authenticate a UE with default UE credentials or provide means to another entity to do it.

NPN: Non-public network which can refers to one or both SNPN and PNI-NPN

NPN credentials: Information that the UE uses for authentication to access an NPN. NPN credentials may be 3GPP credentials or non-3GPP credentials.

Onboarding network (ON): The network providing initial registration and/or access to the UE for UE onboarding.

Provisioning server: A server that provisions the authenticated/authorized UE with the subscription data and optionally other configuration information.

Remote provisioning: Provisioning of information to a UE and within the network which is required for the UE to get authorized access and connectivity to an NPN.

Subscription owner (SO): An entity that stores and as a result of the UE onboarding procedures provides subscription data and optionally other configuration information via the PS to the UE.

UE onboarding: Enabling 3GPP connectivity for UE to realize remote provisioning.

Figure 1:
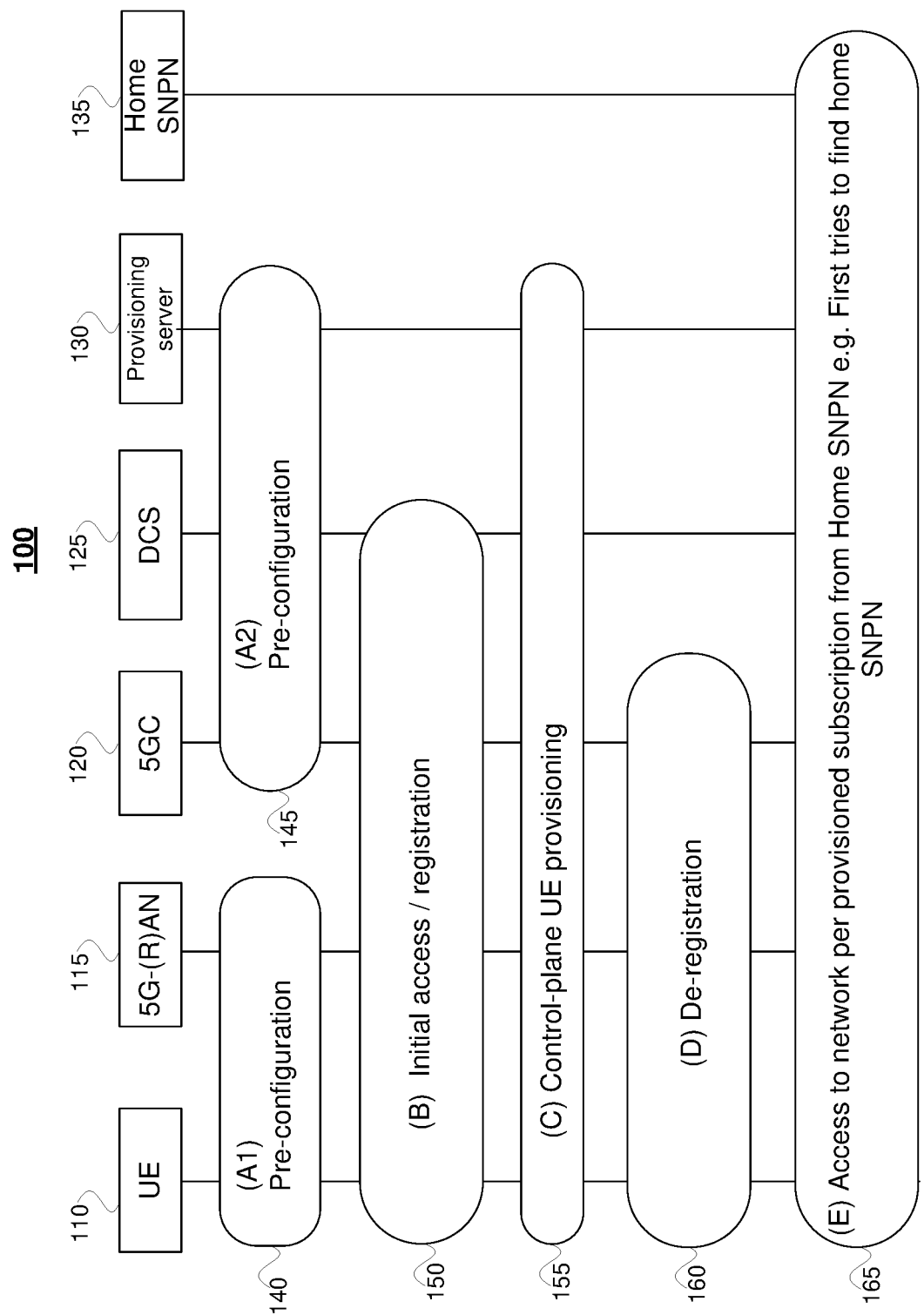
FIG. 1 shows an example of a control plane-based procedure for onboarding and provisioning.

FIG. 1 depicts an example of a control plane-based procedure for onboarding and provisioning. See 3GPP TR 23.700-07 for some details. FIG. 1 shows various functional blocks in some embodiments of the disclosed subject matter. Functions performed by the blocks other than the UE can be combined or partitioned into blocks differently form that shown in FIG. 1. At 140, pre-configuration of the UE 110 5G and radio access network (RAN) 115 occurs and at 145, pre-configuration of the 5G core network (5GC) 120, default credential server (DCS) 125 and provisioning server (PS) 130 occurs. At 150, initial access/registration is performed between the UE 110, 5G-RAN 115, 5GC 120 and DCS 125. At 155, control-plane provisioning occurs across the UE 110, 5G-RAN 115, 5GC 120, DCS 125, and PS server 130. Provisioning is further details in FIG. 2. At 160, deregistration occurs between the UE 110, 5G-RAN 115, and 5GC 120. At 165, access to network is provided to UE 110 per provisioned subscription from the home SNPN 135 via 5G-RAN 115, 5GC 120, DCS 125, and PS server 130. Throughout this patent document the terms UE and wireless device are used interchangeably and refer to any wireless device, mobile station, user equipment, and so on.

Figure 2:
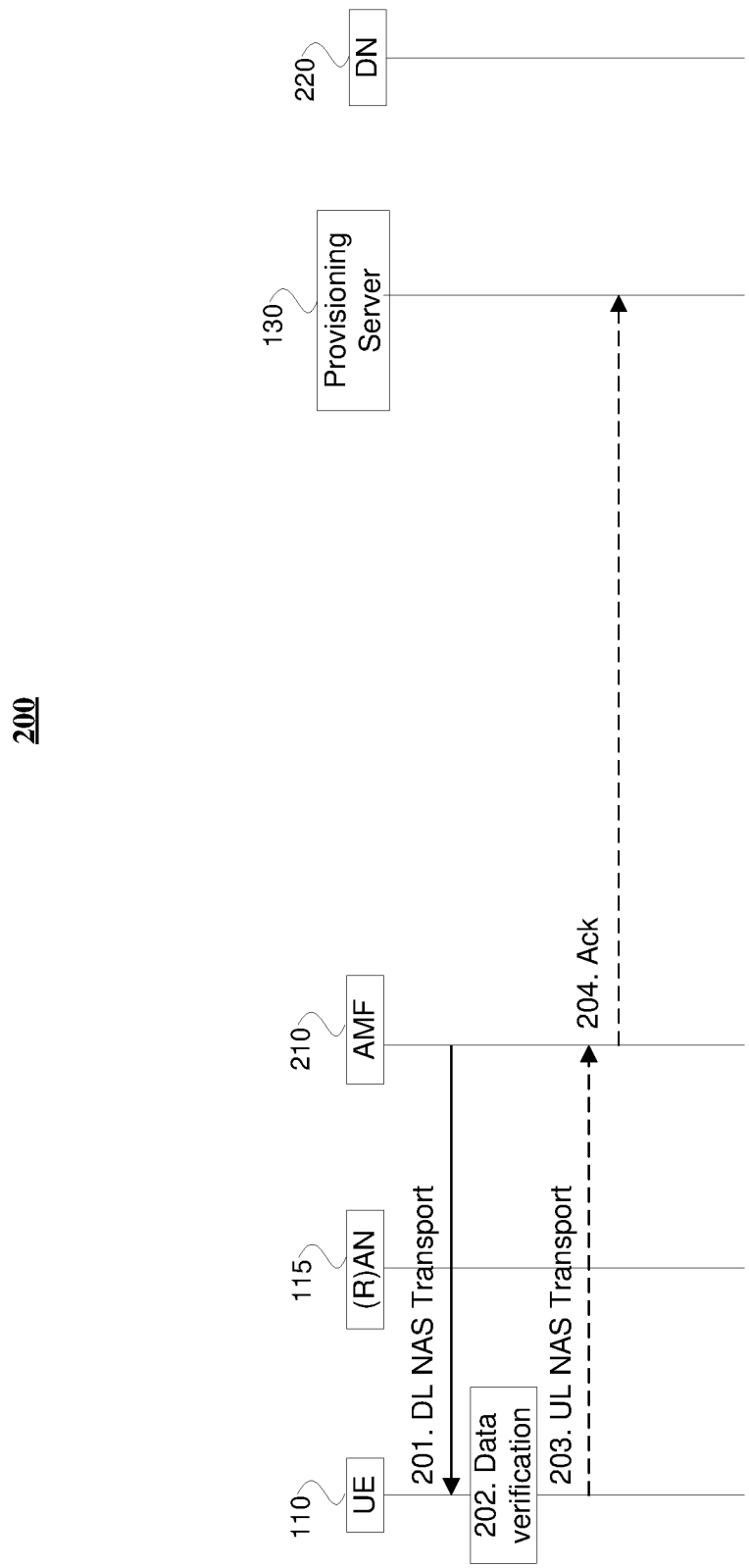
FIG. 2 further details control plane UE provisioning sequence flow of onboarding shown in FIG. 1.

FIG. 2 further details control plane UE provisioning sequence flow of onboarding shown at 155 in FIG. 1. At 201, the AMF 210 sends a downlink (DL) non-access stratum (NAS) transport message to the UE 110. At 202, the UE performs data verification. At 203, the UE 110 sends an uplink (UL) NAS transport message to the AMF 210. At 204, the AMF 210 sends an acknowledgement message to provisioning server 130.

Figure 3:
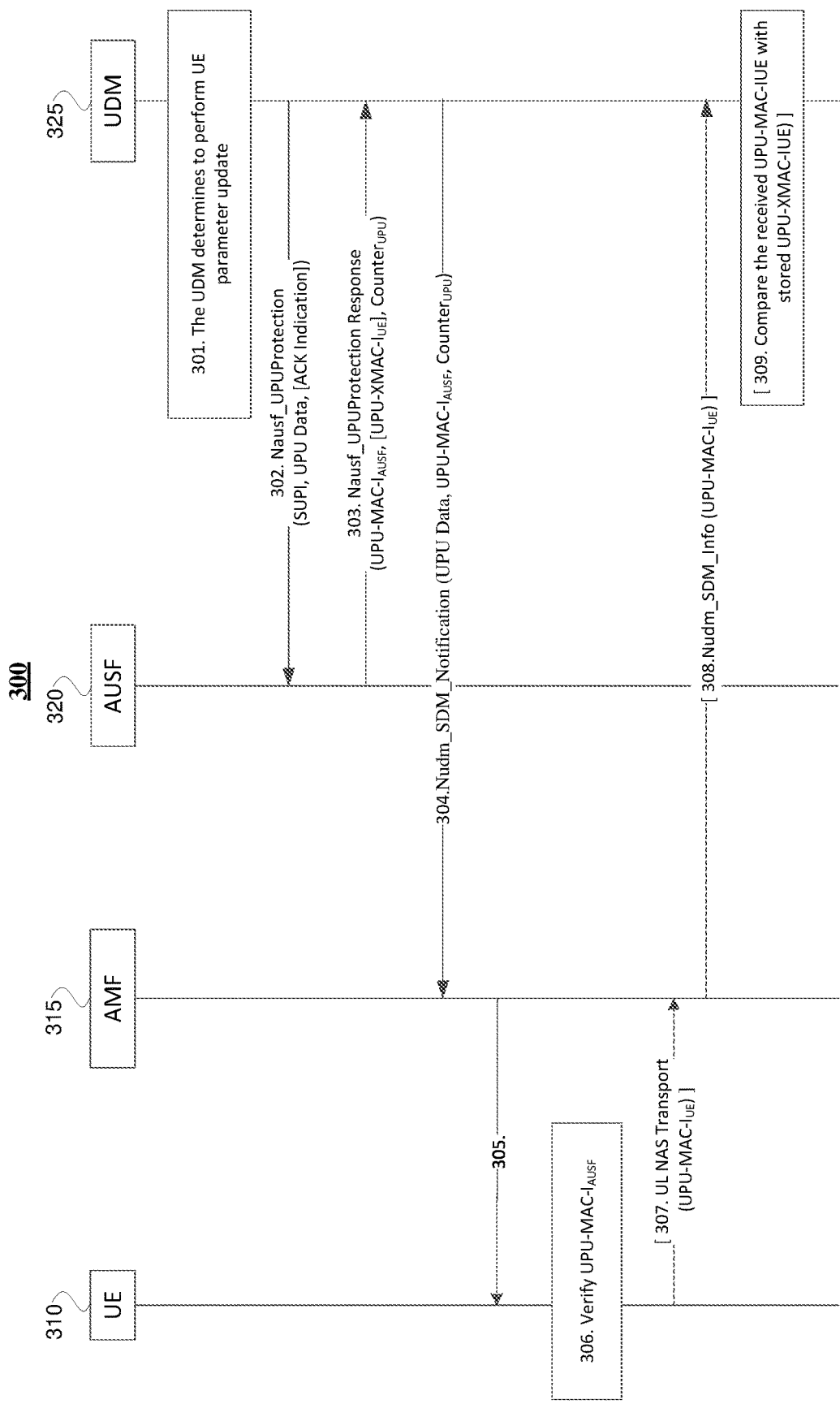
FIG. 3 shows an example of a provisioning procedure based on a user equipment parameter update (UPU) procedure showing the security of UPU messages.

A provisioning procedure is shown in FIG. 3 based on a UE parameter update (UPU) procedure showing security of UPU messages. At 301, unified data management (UDM) 325 determines to perform a UE parameter update. At 302, the UDM 325 sends a Nausf_UPUProtection (SUPI, UPU Data, [ACK Indication]) message to authentication function (AUSF) 320. At 303, AUSF 320 responds to UDM 325 with a Nausf_UPUProtection Response (UPU-MAC-$I_{AUSF}$, [UPU-XMAC-$I_{UE}$], Counter$_{UPU}$) message. At 304, UDM 304 sends a Nudm_SDM_Notification (UPU Data, UPU-MAC-$I_{AUSF}$, Counter$_{UPU}$) message to AMF 315. At 305, AMF 315 sends a DL NAS Transport (UPU Data, UPU-MAC-$I_{AUSF}$, Counter$_{UPU}$) message to UE 310. At 306, the UE 310 verifies UPU-MAC-$I_{AUSF}$. At 307, UE 310 sends UL NAS Transport (UPU-MAC-$I_{UE}$) to AMF 315. At 308, AMF 315 sends Nudm_SDM_Info (UPU-MAC-$I_{UE}$). At 309, UDM 325 compares the received UPU-MAC-$I_{UE}$ with the stored UPU-XMAC-$I_{UE}$).

However, in previous systems with a NPN, no security credential is established between the UE and the provisioning server in the onboarding procedure. Thus, in these previous systems, the UPU messages are not protected. The disclosed subject matter provides a solution to protect UPU messages in NPN networks and other applications.

Figure 4:
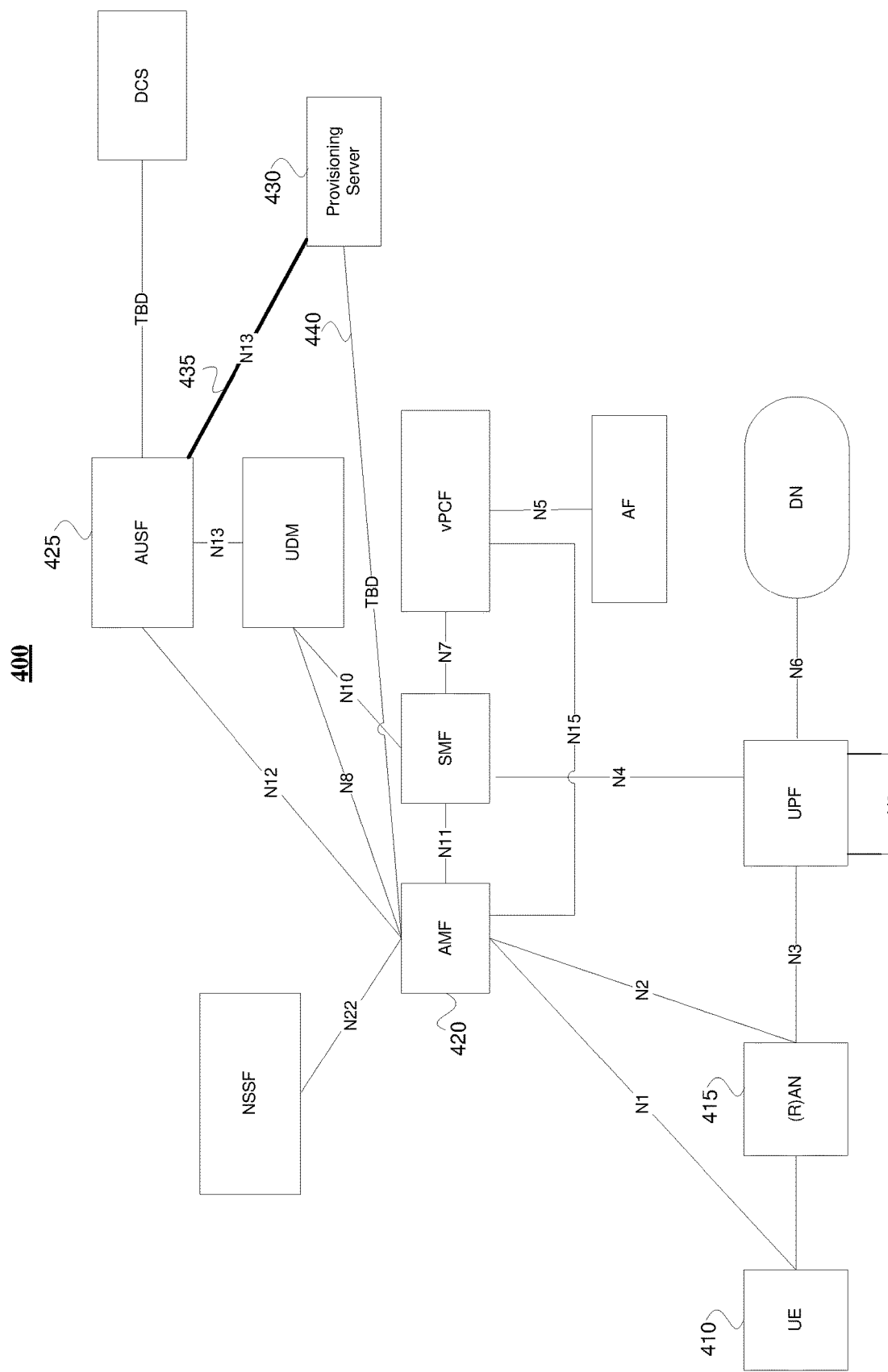
FIG. 4 depicts a system architecture, in accordance with some example embodiments.

FIG. 4 depicts a system architecture, in accordance with some example embodiments. PS 430 and AUSF 425 of the onboarding network are connected with an N13 interface 435. Also shown in FIG. 4 are UE 410, RAN 415, AMF 420, and AUSF 425 with associated interfaces between elements. AMF 420 may have an interface 440 with PS 430.

Figure 5:
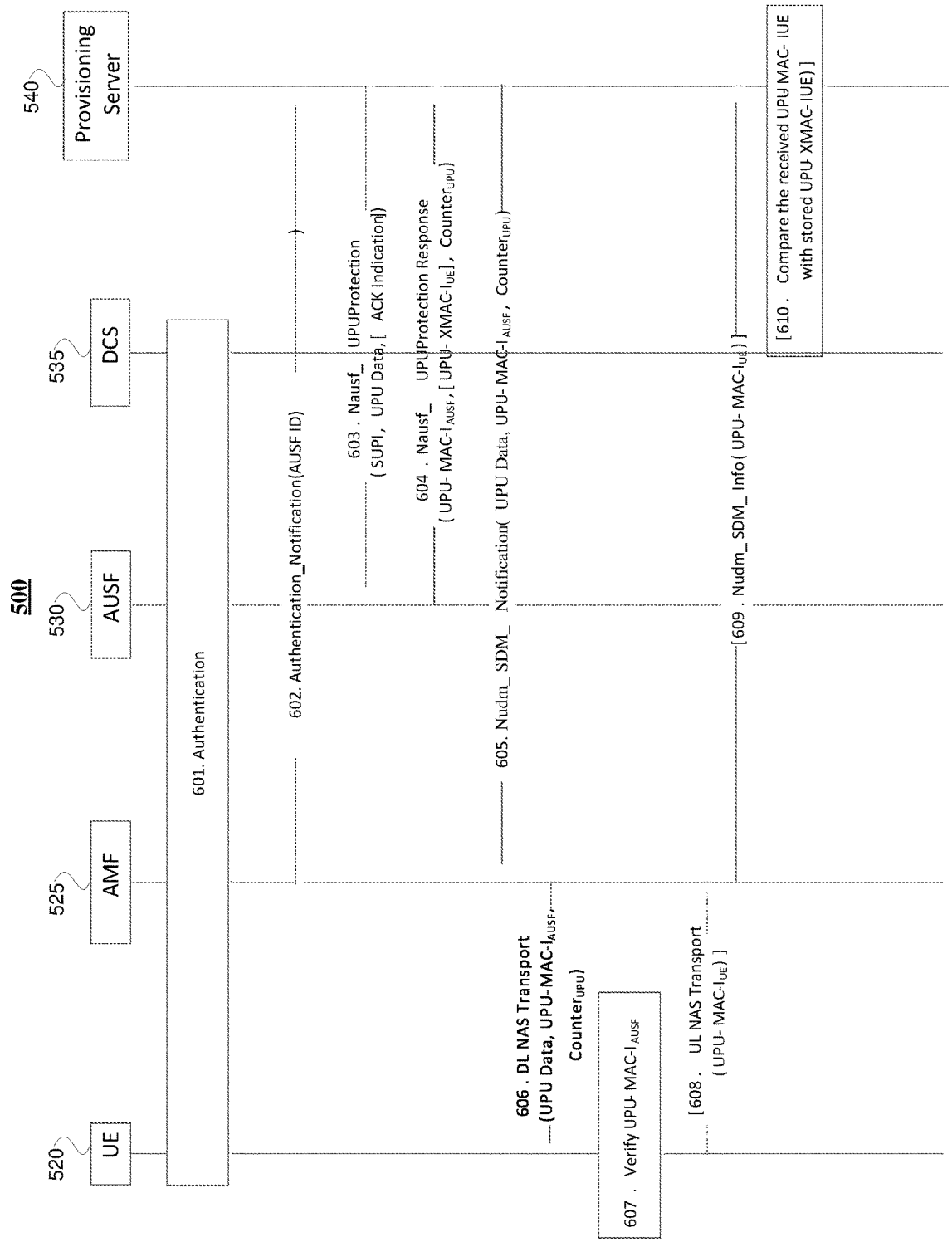
FIG. 5 depicts an example of a procedure performed by the system of FIG. 4.

FIG. 5 depicts an example of a procedure performed by the system of FIG. 4.

At 501, a successful authentication has been performed among the UE 520, the onboarding network and a default credential server (DCS) 535. The UE 520 and the AUSF 530 store the key $K_{AUSF}$.

At 502, the AMF 525 sends an authentication_notification to the PS 540 of the UE 520, including the AUSF ID of the AUSF 530 which stores the $K_{AUSF}$.

At 503-504, the PS 540 invokes a Nausf_UPUProtection service operation message by including the UPU Data to the AUSF 530 indicated by the AUSF ID received in the last message to get UPU-MAC-$I_{AUSF}$ and Counter$_{UPU}$. If the PS 540 determines that the UE 520 is to acknowledge the successful security check of the received UE parameters update data, then the PS 540 sets the corresponding indication in the UE parameters update data and include the ACK indication in the Nausf_UPUProtection service operation message to signal that it also needs the expected UPU-XMAC-$I_{UE}$.

The inclusion of UE parameters update data in the calculation of UPU-MAC-$I_{AUSF}$ allows the UE 520 to verify that it has not been tampered with by any intermediary. The expected UPU-XMAC-$I_{UE}$ allows the PS 540 to verify that the UE 520 received the UE parameters update data correctly.

At 505, the PS 540 invokes a Nudm_SDM_Notification service operation which contains UE parameters update data, UPU-MAC-$I_{AUSF}$, Counter$_{UPU}$ within the access and mobility subscription data. If the PS 540 requests an acknowledgement, it temporarily stores the expected UPU-XMAC-$I_{UE}$.

At 506, upon receiving the Nudm_SDM_Notification message, the AMF 525 sends a DL NAS transport message to the served UE 520. The AMF 525 includes in the DL NAS transport message the transparent container received from the PS 540.

At 507, upon receiving the DL NAS transport message, the UE 520 calculates the UPU-MAC-$I_{AUSF}$ in the same way as the AUSF on the received UE parameters update data and the Counter$_{UPU}$ and verify whether it matches the UPU-MAC-$I_{AUSF}$ value received in the DL NAS Transport message. If the verification of UPU-MAC-$I_{AUSF}$ is successful and the UPU data contains any parameters that is protected by secured packet, the ME shall forward the secured packet to the USIM using additional procedures. If the verification of UPU-MAC-$I_{AUSF}$ is successful and the UPU Data contains any parameters that is not protected by secure packet, the ME updates its stored parameters with the received parameters in PS update data.

At 508, if the PS 540 has requested an acknowledgement from the UE 520 and the UE 520 has successfully verified and updated the UE parameters update data provided by the PS 540, then the UE 520 shall send the UL NAS transport message to the serving AMF 525. The UE 520 generates the UPU-MAC-$I_{UE}$ and include the generated UPU-MAC-$I_{UE}$ in a transparent container in the UL NAS transport message.

At 509, if a transparent container with the UPU-MAC-$I_{UE}$ was received in the UL NAS transport message, the AMF 525 sends a Nudm_SDM_Info request message with the transparent container to the PS.

At 510, if the PS indicated that the UE 520 is to acknowledge the successful security check of the received UE parameters update data, then the PS shall compare the received UPU-MAC-$I_{UE}$ with the expected UPU-XMAC-$I_{UE}$ that the PS stored temporarily in 505 above.

Figure 6:
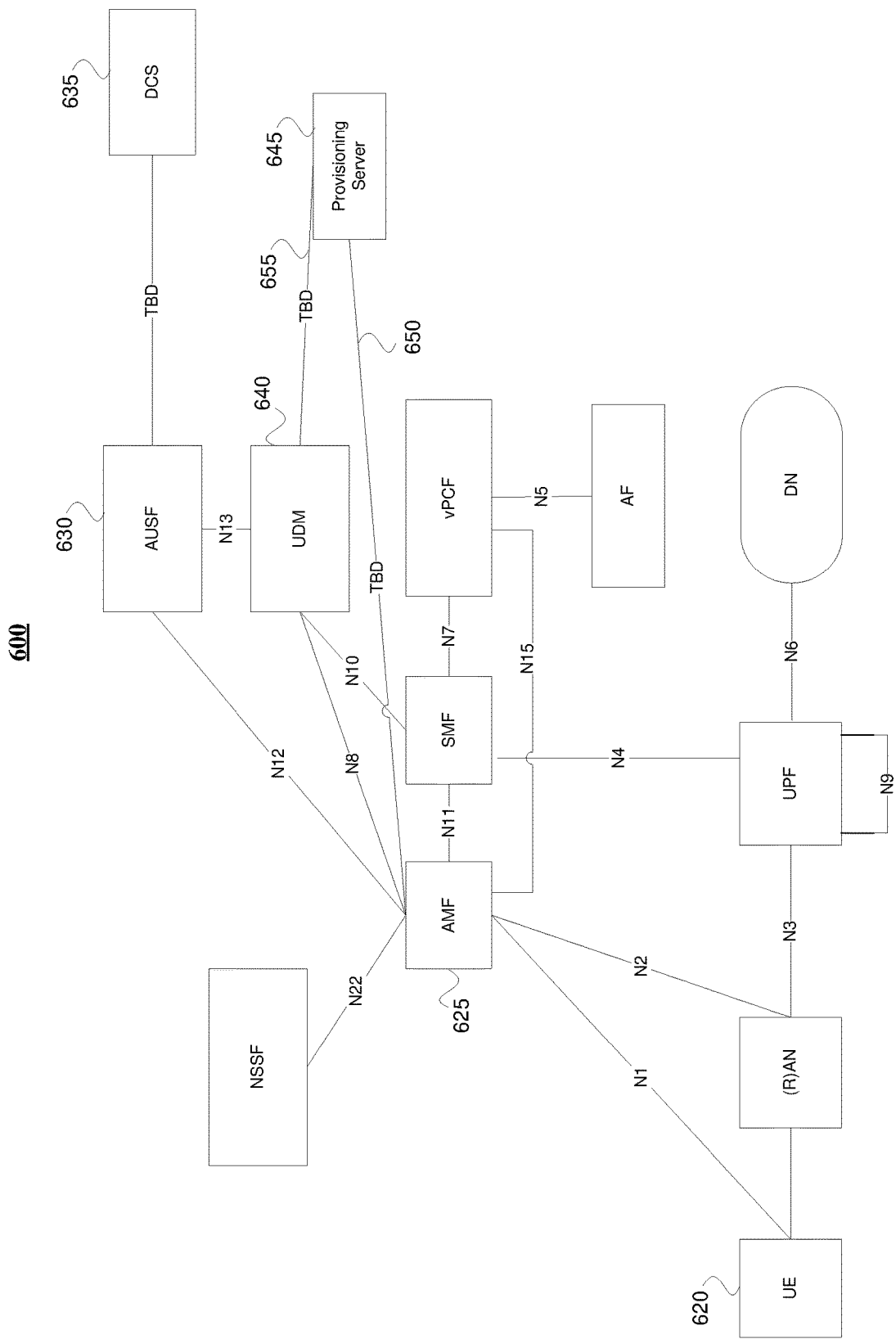
FIG. 6 depicts another system architecture, in accordance with some example embodiments.

FIG. 6 depicts another system architecture, in accordance with some example embodiments. Here, the PS 645 and the AMF 625 of the onboarding network are connected with a new interface 650. In some example embodiments, PS 645 and the UDM 640 also have new interface 655.

Figure 7:
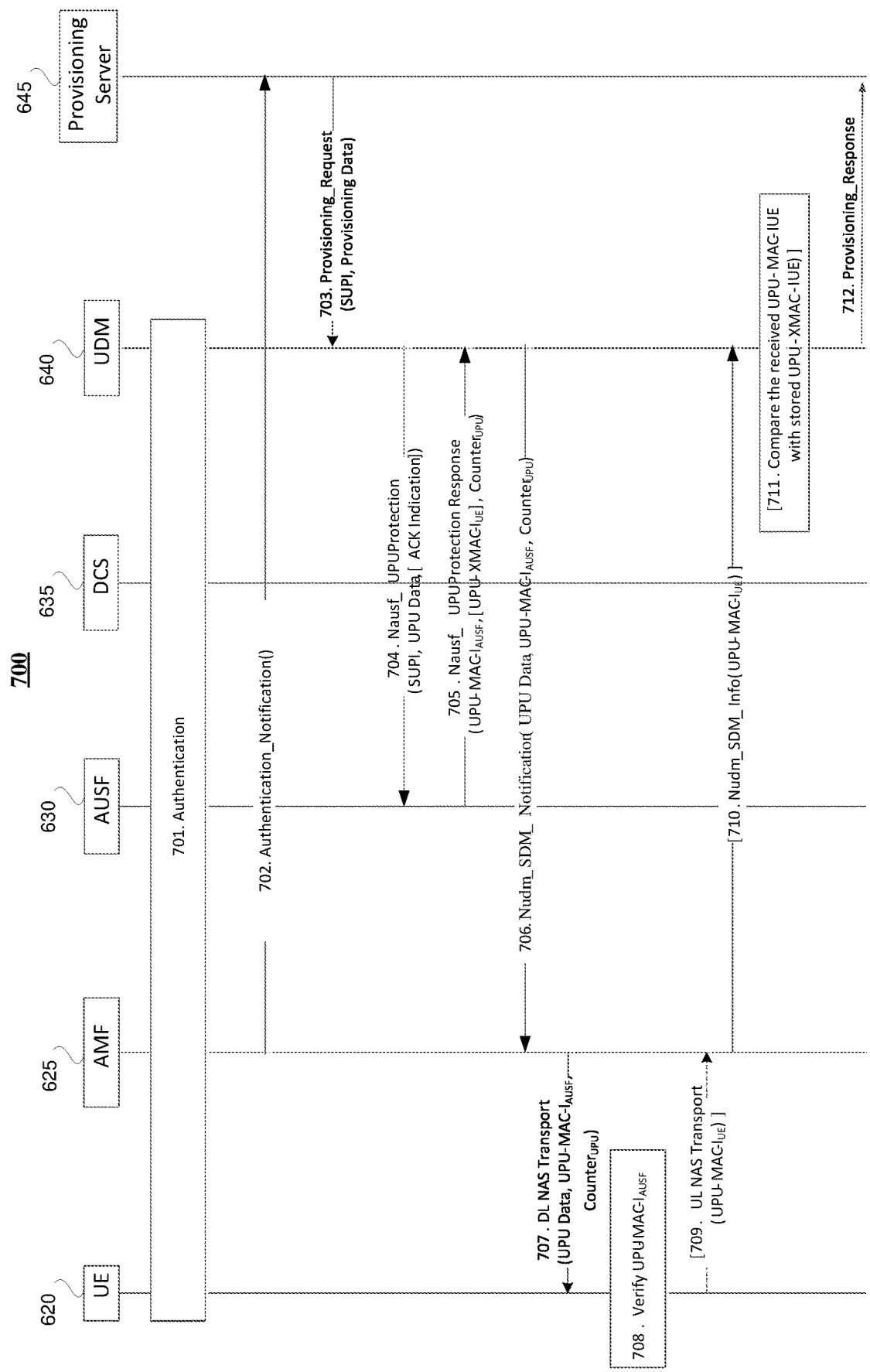
FIG. 7 depicts an example of a procedure performed by the system of FIG. 6.

FIG. 7 depicts an example of a procedure performed by the system of FIG. 6.

At 701, a successful authentication has been performed among the UE 620, the onboarding network and the DCS 635. The UE 620 and the AUSF 630 store the key, $K_{AUSF}$.

At 702, the AMF 625 sends an authentication_notification to the PS 645 of the UE 620.

At 703, the PS 645 sends a provisioning_request message to the UDM 640, including subscriber permanent identifier (SUPI) and provisioning data.

At 704-705, the UDM 640 invokes a Nausf_UPUProtection service operation message by including the UPU dData to the AUSF 630 to get UPU-MAC-$I_{AUSF}$ and Counter$_{UPU}$. If the UDM 640 determines that the UE 620 is to acknowledge the successful security check of the received UE parameters update data, then the UDM 640 sets the corresponding indication in the UE parameters update data and includes the acknowledgement (ACK) indication in the Nausf_UPUProtection service operation message to signal that it also needs the expected UPU-XMAC-$I_{UE}$.

The inclusion of UE parameters update data in the calculation of UPU-MAC-$I_{AUSF}$ allows the UE 620 to verify that it has not been tampered with by any intermediary. The expected UPU-XMAC-$I_{UE}$ allows the UDM 640 to verify that the UE 620 received the UE parameters update data correctly.

At 706, the UDM shall invoke Nudm_SDM_Notification service operation, which contains UE parameters update data, UPU-MAC-$I_{AUSF}$, Counter$_{UPU}$ within the access and mobility subscription data. If the PS 645 requests an acknowledgement, it temporarily stores the expected UPU-XMAC-$I_{UE}$.

At 707, upon receiving the Nudm_SDM_Notification message, the AMF 625 sends a DL NAS transport message to the served UE. The AMF 625 includes in the DL NAS transport message the transparent container received from the UDM 640.

At 708, upon receiving the DL NAS transport message, the UE 620 calculates the UPU-MAC-$I_{AUSF}$ in the same way as the AUSF 630 on the received UE parameters update data and the Counter$_{UPU}$ and verify whether it matches the UPU-MAC-$I_{AUSF}$ value received in the DL NAS transport message. If the verification of UPU-MAC-$I_{AUSF}$ is successful and the UPU data contains any parameters that is protected by secured packet, the ME forwards the secured packet to the USIM using additional procedures. If the verification of UPU-MAC-$I_{AUSF}$ is successful and the UPU data contains any parameters that is not protected by secure packet, the ME updates its stored parameters with the received parameters in PS update data.

At 709, if the UDM 640 has requested an acknowledgement from the UE 620 and the UE has successfully verified and updated the UE parameters update data provided by the PS 645, then the UE 620 sends the UL NAS transport message to the serving AMF 625. The UE 620 generates the UPU-MAC-$I_{UE}$ and includes the generated UPU-MAC-$I_{UE}$ in a transparent container in the UL NAS transport message.

At 710, if a transparent container with the UPU-MAC-$I_{UE}$ was received in the UL NAS transport message, the AMF 625 shall send a Nudm_SDM_Info request message with the transparent container to the UDM 640.

At 711, if the UDM 640 indicates that the UE 620 is to acknowledge the successful security check of the received UE parameters update data, then the UDM 640 shall compare the received UPU-MAC-$I_{UE}$ with the expected UPU-XMAC-$I_{UE}$ that the PS 645 stored temporarily at 706.

At 712, the UDM 640 sends a provisioning_response message to the PS 645, including result code of the provisioning operation.

Figure 8:
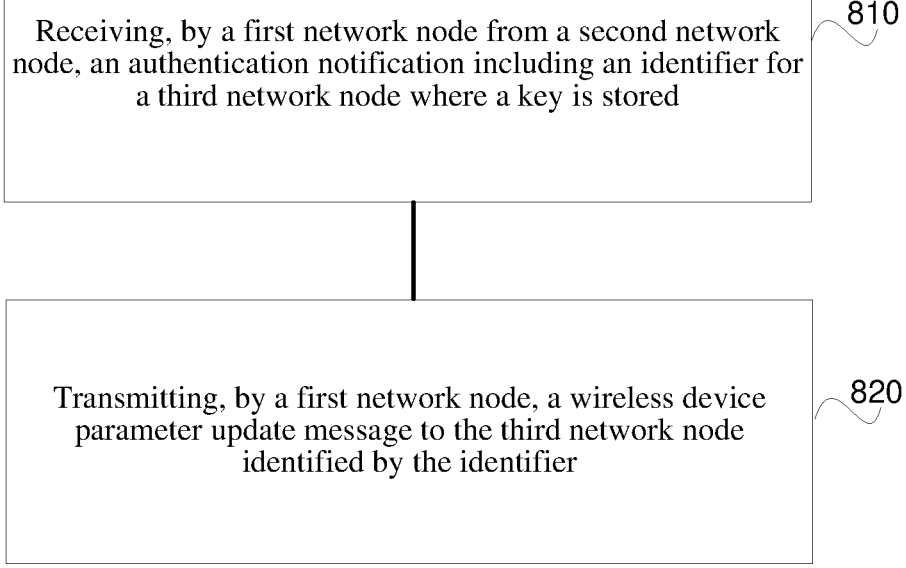

FIG. 8 shows an example of a method 800 for wireless communication. At 810, in some embodiments of the disclosed technology, the method includes receiving, by a first network node from a second network node, an authentication notification including an identifier for a third network node where a key is stored. At 820, the method includes transmitting, by a first network node, a wireless device parameter update message to the third network node identified by the identifier.

FIG. 9 shows another example of a method 900 for wireless communication. At 910, in some embodiments of the disclosed technology, the method includes receiving, by a first network node from a second network node, an authentication notification indicating a successful authentication of a wireless device. At 920. the method includes transmitting, by the first network node to a third network node a provisioning request message including an identifier of the wireless device and provisioning data.

Figure 10:
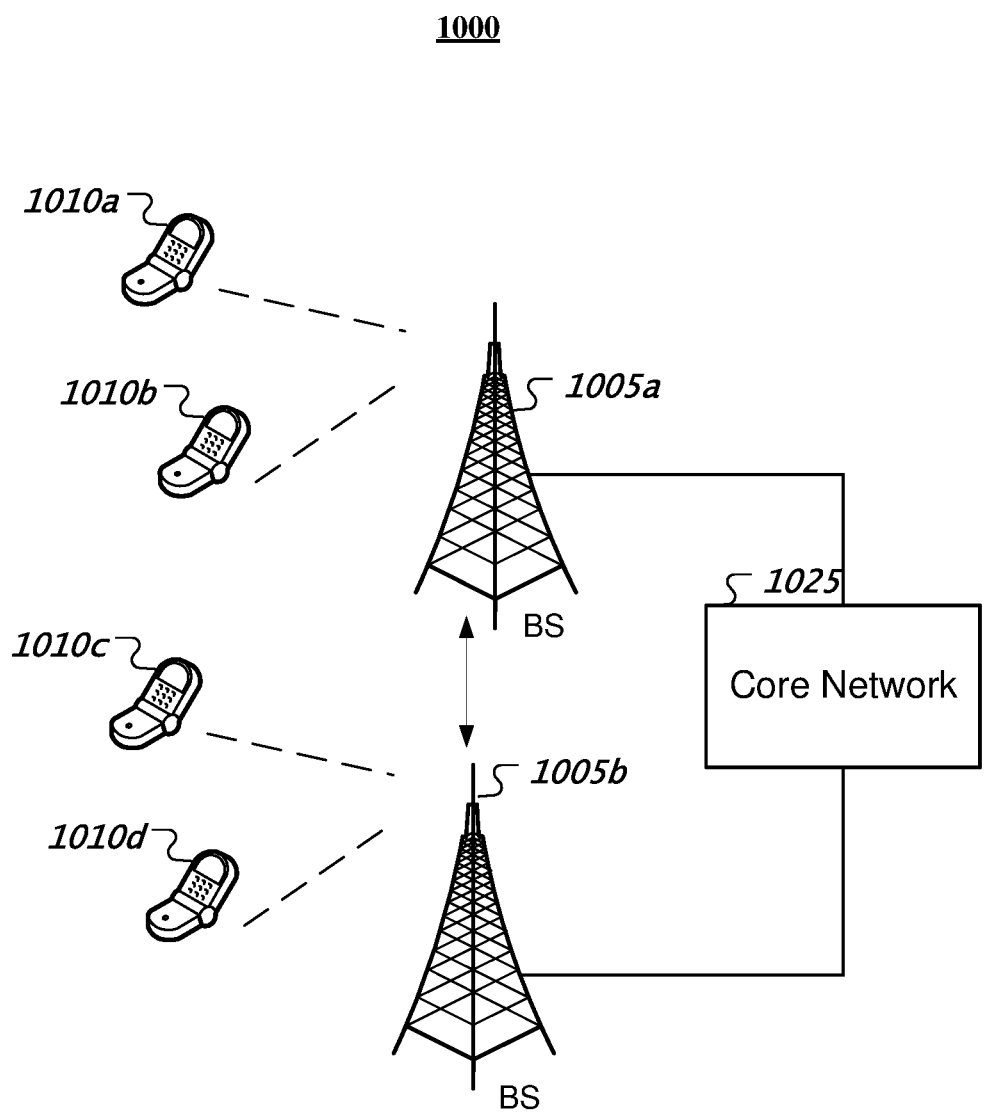
FIG. 10 shows an example of a wireless communication system in which one or more embodiments of the present technology can be applied.

FIG. 10 shows an example of a wireless communication system 1000 where techniques in accordance with one or more embodiments of the present technology can be applied. A wireless communication system 1000 can include one or more base stations (BS s) 1005a, 1005b, one or more wireless devices 1010a, 1010b, 1010c, 1010d, and a core network 1025. A base station 1005a, 1005b can provide wireless service to wireless devices 1010a, 1010b, 1010c and 1010d in one or more wireless sectors. In some implementations, a base station 1005a, 1005b includes directional antennas to produce two or more directional beams to provide wireless coverage in different sectors. The base station 1005a, 1005b may communicate directly with one another wirelessly or via a wired interface including a direct wired interface, a wired network, or the Internet. Various network nodes of the disclosed subject matter can be implemented at the base station and/or core network including the RAN, AMF, PS, AUSF, UDM, DCS, and various other elements depicted in FIGS. 4 and 6.

The core network 1025 can communicate with one or more base stations 1005a, 1005b. The core network 1025 provides connectivity with other wireless communication systems and wired communication systems. The core network may include one or more service subscription databases to store information related to the subscribed wireless devices 1010a, 1010b, 1010c, and 1010d. A first base station 1005a can provide wireless service based on a first radio access technology, whereas a second base station 1005b can provide wireless service based on a second radio access technology. The base stations 1005a and 1005b may be co-located or may be separately installed in the field according to the deployment scenario. The wireless devices 1010a, 1010b, 1010c, and 1010d can support multiple different radio access technologies. The techniques and embodiments described in the present document may be implemented by the base stations described in the present document or by wireless devices.

Figure 11:
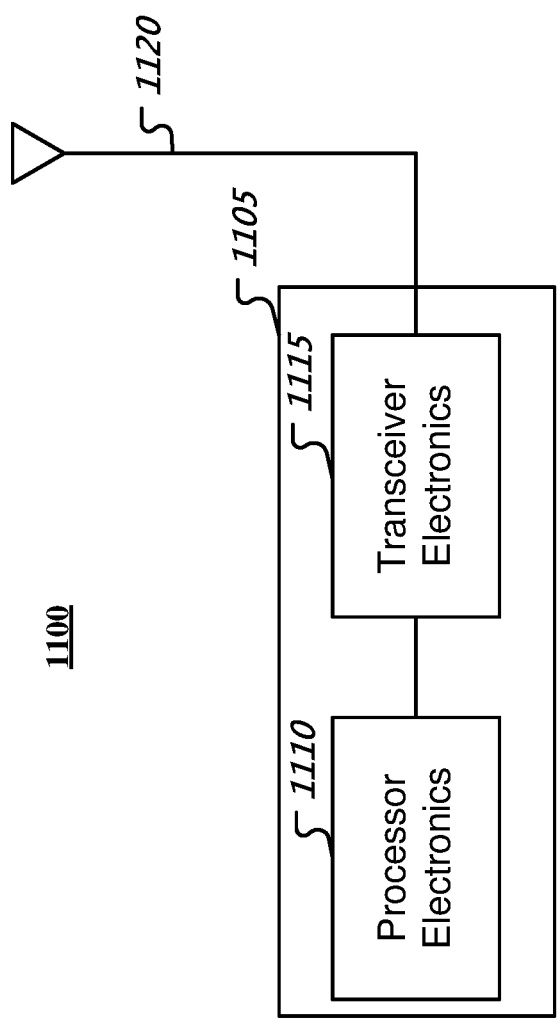
FIG. 11 shows an example of a block diagram representation of a portion of a radio station in which one or more embodiments of the present technology can be applied.

FIG. 11 is a block diagram representation of a portion of a radio station in accordance with one or more embodiments of the present technology can be applied. A radio 1105 such as a base station/core network or a wireless device (or UE)

can include electronics 1110 such as a microprocessor that implements one or more of the wireless techniques presented in this document. The radio 1105 can include transceiver electronics 1115 to send and/or receive wireless signals over one or more communication interfaces such as antenna 1120. The radio 1105 can include other communication interfaces for transmitting and receiving data. Radio 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the radio 1105. In some embodiments, the radio 1105 may be configured to perform the methods described in this document, including implementation of a network node as described herein.

Some embodiments may preferably implement one or more of the following solutions, listed in clause-format. The following clauses are supported and further described above and throughout this document. As used in the clauses below and in the claims, a wireless device may be user equipment, mobile station, or any other wireless terminal including fixed nodes such as base stations. A network node includes a base station including a next generation Node B (gNB), enhanced Node B (eNB), or any other device that performs as a base station. As noted above, network nodes at the base station and/or core network perform the various functions including the RAN, AMF, PS, AUSF, UDM, DCS, and various other elements depicted in FIGS. 4 and 6.

The technical solutions described by the following clauses may be preferably implemented by some embodiments.

Clause 1. A method comprising: receiving, by a first network node from a second network node, an authentication notification including an identifier for a third network node where a key is stored; and transmitting, by a first network node, a wireless device parameter update message to the third network node identified by the identifier.

Clause 2. The method of clause 1, wherein the key is an authentication server function key (KAUSF).

Clause 3. The method of clause 1, wherein the first network node is a provisioning server (PS) node.

Clause 4. The method of clause 1, wherein the second network node is an access and mobility management function (AMF) node.

Clause 5. The method of clause 1, wherein the third network node is an authentication server function (AUSF) node.

Clause 6. The method of clause 5, wherein the key is stored at the wireless device and the AUSF.

Clause 7. The method of clause 1, wherein the first network node, the second network node, and the third network node comprise a non-public network (NPN).

Clause 8. The method of clause 1, wherein the wireless device is one or more of a user equipment, smartphone, tablet, laptop, or other wireless user device.

Clause 9. A method comprising: receiving, by a first network node from a second network node, an authentication notification indicating a successful authentication of a wireless device; and transmitting, by the first network node to a third network node a provisioning request message including an identifier of the wireless device and provisioning data.

Clause 10. The method of clause 9, further comprising: receiving, by the first network node a provisioning response message including a result code of a provisioning operation identified in the provisioning request message.

Clause 11. The method of clause 9, wherein the response message is a provisioning response message.

Clause 12. The method of clause 9, wherein the first network node is a provisioning server (PS) node.

Clause 13. The method of clause 9, wherein the second network node is an access and mobility management function (AMF) node.

Clause 14. The method of clause 9, wherein the third network node is a unified data management (UDM) node.

Clause 15. The method of clause 9, wherein the identifier is subscriber permanent identifier (SUPI).

Clause 16. The method of clause 9, wherein the wireless device is one or more of a user equipment, smartphone, tablet, laptop, or other wireless user device.

Clause 17. An apparatus, comprising a processor configured to implement a method recited in any one or more of clauses 1 to 16.

Clause 18. A computer program product having code stored thereon, the code, when executed by a processor, causing the processor to implement a method recited in any one or more of clauses 1 to 16.

In the technical solutions described herein in clause format, the network node may be a network device or a network-side equipment such as the network elements detailed in the FIGS. 1-9. FIG. 11 shows an example hardware platform for implementing the network node or a wireless device.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

What is claimed is:

1. A method comprising:
    receiving, by a first network node from a second network node, an authentication notification including an identifier for a third network node where a key is stored;
    determining, by the first network node, that a wireless device is to acknowledge successful security check of received wireless device parameters update; and
    transmitting, by the first network node, a wireless device parameter update message to the third network node identified by the identifier, wherein the wireless device parameter update message includes acknowledgement of successful security check of the received wireless device parameters update and a request of expected wireless device parameters.

2. The method of claim 1, wherein the key is an authentication server function key (KAUSF).

3. The method of claim 1, wherein the first network node is a provisioning server (PS) node.

4. The method of claim 1, wherein the second network node is an access and mobility management function (AMF) node.

5. The method of claim 1, wherein the third network node is an authentication server function (AUSF) node.

6. The method of claim 5, wherein the key is stored at the wireless device and the AUSF.

7. The method of claim 1, wherein the first network node, the second network node, and the third network node comprise a non-public network (NPN).

8. The method of claim 1, wherein the wireless device is one or more of a user equipment, smartphone, tablet, laptop, or other wireless user device.

9. A method comprising:
    receiving, by a first network node from a second network node, an authentication notification indicating a successful authentication of a wireless device;
    transmitting, by the first network node to a third network node a provisioning request message including an identifier of the wireless device and provisioning data; and
    receiving, by the first network node, a provisioning response message including a result code of a provisioning operation identified in the provisioning request message based on a comparison of wireless device parameters update included in the provisioning data and expected wireless device parameters.

10. The method of claim 9, wherein the first network node is a provisioning server (PS) node.

11. The method of claim 9, wherein the second network node is an access and mobility management function (AMF) node.

12. The method of claim 9, wherein the third network node is a unified data management (UDM) node.

13. The method of claim 9, wherein the identifier is subscriber permanent identifier (SUPI).

14. The method of claim 9, wherein the wireless device is one or more of a user equipment, smartphone, tablet, laptop, or other wireless user device.

15. An apparatus comprising a processor configured to perform a method comprising:
    receiving, by a first network node from a second network node, an authentication notification including an identifier for a third network node where a key is stored;
    determining, by the first network node, that a wireless device is to acknowledge successful security check of received wireless device parameters update;
    transmitting, by the first network node, a wireless device parameter update message to the third network node identified by the identifier, wherein the wireless device parameter update message includes acknowledgement of successful security check of the received wireless device parameters update and a request of expected wireless device parameters.

16. The method of claim 15, wherein the key is an authentication server function key (KAUSF).

17. The method of claim 15, wherein the first network node is a provisioning server (PS) node.

18. The method of claim 15, wherein the second network node is an access and mobility management function (AMF) node.

* * * * *